June 1, 1965  W. F. VETTER  3,187,328
OBSTACLE INDICATING DOPPLER SYSTEM
Original Filed Sept. 19, 1955  3 Sheets-Sheet 1

June 1, 1965  W. F. VETTER  3,187,328
OBSTACLE INDICATING DOPPLER SYSTEM
Original Filed Sept. 19, 1955  3 Sheets-Sheet 2

United States Patent Office 3,187,328
Patented June 1, 1965

3,187,328
OBSTACLE INDICATING DOPPLER SYSTEM
William F. Vetter, Huntington Station, N.Y., assignor to Hazeltine Research Inc., a corporation of Illinois
Continuation of abandoned application Ser. No. 535,066, Sept. 19, 1955. This application Feb. 4, 1960, Ser. No. 7,056
14 Claims. (Cl. 343—7)

General

This application is a continuation of application Serial No. 535,066, filed September 19, 1955, now abandoned.

The present invention is directed to systems for use on moving objects for developing an indication representative of the presence of obstacles in the path of those objects. The system has particular utility on an aircraft for indicating the presence of a fixed obstacle or obstruction such as a tall building or a mountain directly in the path of the craft while distinguishing from obstacles in the general path of the craft but not in the direct path thereof. Accordingly, the invention will be described in that environment.

Need has existed for an obstacle-indicating system for providing on a moving aircraft a warning of dangerous fixed obstructions in the direction of flight of the craft. Preferably such a system should be light in weight, compact, relatively low in cost, and economical of power. In addition, an obstacle-indicating system should be reliable in operation to the extent that it provides an adequate warning of the presence of dangerous obstacles in the path of an aircraft in flight but is capable of discriminating against false warnings from fixed objects adjacent the path of the craft but not directly in that path.

It is an object of the invention, therefore, to provide a new and improved obstacle-indicating system which is relatively simple in construction, compact, light in weight, and low in power consumption.

It is another object of the invention to provide for use on an aircraft a new and improved obstacle-indicating system which does not require the constant attention of the aviator.

It is a further object of the invention to provide for use on an aircraft a new and improved obstacle-indicating system which does not require a complex and bulky antenna system.

It is a still further object of the invention to provide for use on aircraft a new and improved obstacle-indicating system which is relatively immune to false warnings which may occur when an aircraft is flying at a low altitude.

In accordance with the invention, a system for indicating collision course between two objects including apparatus on one of the objects comprises means for radiating a signal toward the second object and means for receiving reflections of the signal. The system also includes means for deriving Doppler frequency signals from the reflections and means responsive jointly to amplitude and frequency for distinguishing between Doppler frequency signals representative of the second object and those representative of other objects not on the collision course to provide an output signal indicating the presence of said second object on a collision course.

For a better understanding of the present invention, together with other and further objects thereof, reference is had to the following description taken in connection with the accompanying drawings, and its scope will be pointed out in the appended claims.

Referring to the drawings.

Figure 1:
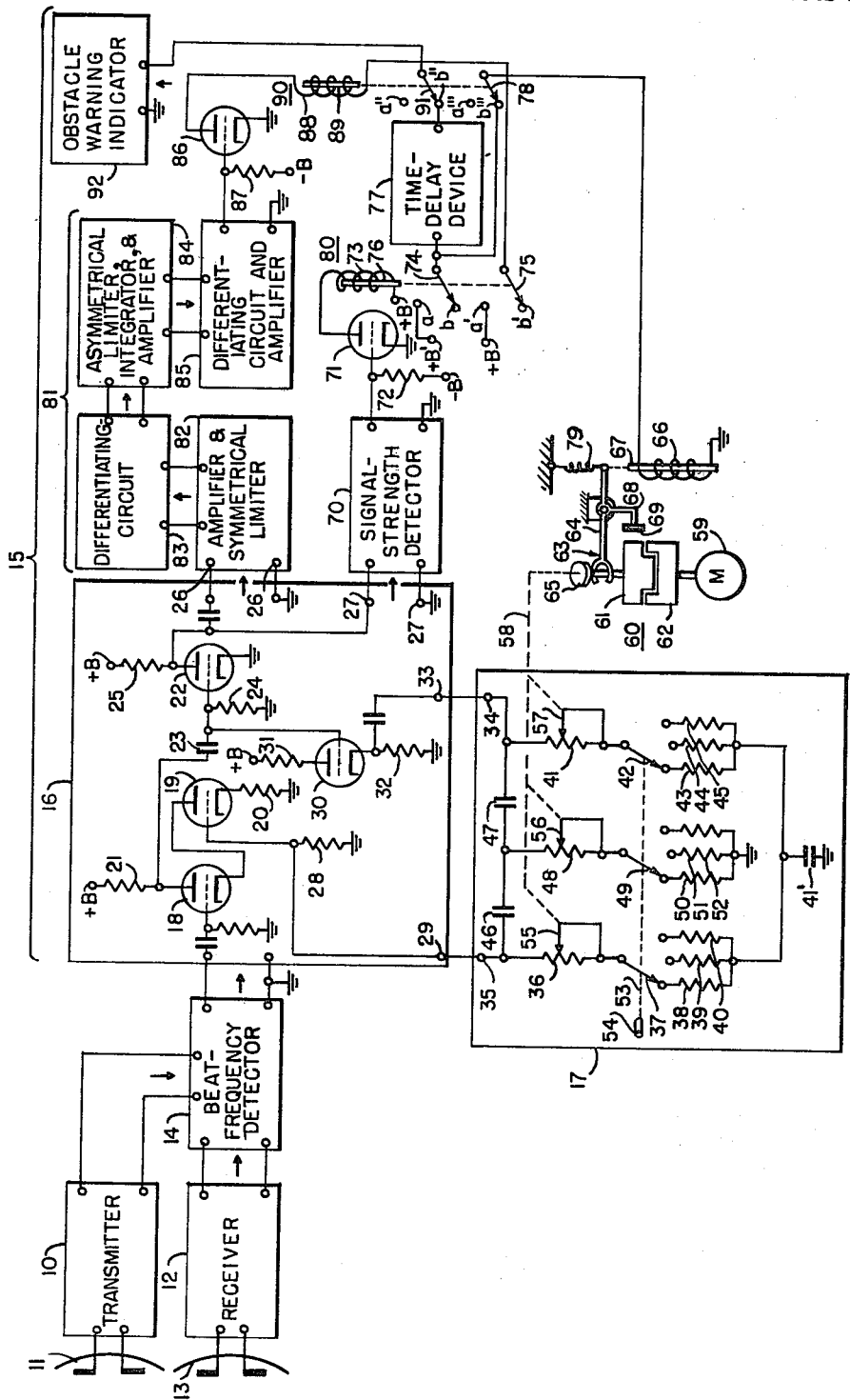
FIG. 1 is a circuit diagram, partly schematic, of a complete obstacle-indicating system in accordance with the present invention.

Description of FIG. 1 obstacle-indicating system

Referring now more particularly to FIG. 1 of the drawings, there is represented for use on an object such as an aircraft capable of moving at selectable substantially constant velocities a system for developing an indication representative of the presence of a fixed obstacle in the path of that aircraft. This indicating system includes means for radiating wave-signal energy in the general path of that object at a substantially constant frequency and for receiving that portion of the aforesaid energy reflected from obstacles in that general path and from an obstacle which may be directly in the path. The radiating means includes a transmitter 10, which may be a magnetron oscillator capable of operating at a high frequency such as 10,000 megacycles per second and a fixed radiating or antenna system 11 such as one of the horn type capable of radiating energy in a broadly directive beam in the general path of the aircraft. A receiver 12 and a broadly directive fixed antenna system 13 similar to antenna system 11 and pointed in the same direction are employed for receiving energy reflected from obstacles in that general path and in the direct path.

The obstacle-indicating system also includes means in the form of a conventional frequency converter or beat-frequency detector 14 for deriving beat-frequency information from the transmitted and received wave-signal energy. To this end, detector 14 includes a suitable input circuit or circuits coupled to suitable output circuits of the transmitter 10 and the receiver 12 for receiving energy therefrom from which to derive the beat-frequency information.

The obstacle-indicating system further includes means responsive jointly to the amplitude of at least a portion of the aforesaid beat-frequency information when that portion lies within a predetermined range of frequencies and to the frequency of that portion when the last-mentioned frequency is substantially constant for providing an indication representative of a fixed obstacle directly in the path while distinguishing from derived beat-frequency information representative of fixed obstacles in that general path but not in the direct path. This indicating means comprises the various units enclosed within the bracket 15 and will be described in detail hereinafter.

One portion of the indicating means just mentioned includes a frequency-selective means 16, 17 preferably in the form of a feedback amplifier having a pass band or frequency-responsive characteristic controllable over a range of frequencies in accordance with the selective velocity of the aircraft for translating the previously mentioned portion of the beat-frequency information primarily related to the velocity of the craft. Unit 16 comprises the main signal-translating channel of the feedback amplifier while unit 17 comprises a twin-T resistor-condenser frequency-control network or feedback circuit for controlling the pass band of the amplifier signal-translating channel 16. The signal-translating channel 16 includes a first tube 18 having its control electrode coupled in a conventional manner to the output circuit of the beat-frequency detector 14 while its cathode is connected to the anode of a tube 19 having its cathode connected to ground through a resistor 20. The anode of tube 18 is connected to a source of potential +B through an anode-load resistor 21 and to the control electrode-cathode input circuit of a tube 22 through a coupling condenser 23 and a grid-leak resistor 24. The anode of tube 22 is connected to a source of potential +B through an anode-load resistor 25 and is also coupled to two pairs of output terminals 26, 26 and 27, 27. The control electrode of tube 19 is connected to ground through a resistor 28 and is also connected to an input terminal 29. The control electrode of the tube 22 is connected to the control electrode of a tube 30 which has its anode connected through a load resistor 31 to a source +B and its cathode connected to ground through a resistor 32. An output terminal 33 is connected to the cathode of tube 30.

The output terminal 33 of the signal-translating channel 16 is coupled to the input terminal 34 of the feedback circuit 17, the latter having an output terminal 35 coupled to the input terminal 29 of unit 16. Terminal 35 is coupled to ground through an adjustable voltage divider 36, a switch blade 37 selectively adjustable through each of three resistors 38, 39, and 40 and through a condenser 41'. Terminal 34 is similarly coupled to ground through similar elements 41–45, inclusive. Condensers 46 and 47 are connected in cascade between terminals 35 and 34 and the junction of these condensers is connected to ground through a voltage divider 48, a switch blade 49, selectively adjustable for connection to each of three resistors 50, 51, and 52. Switch blades 37, 49, and 42 are interconnected by means of a unicontrol mechanism designated by the broken line 53 and the control knob 54. Each setting of the switch blades just mentioned represents a coarse change in the parameters of the feedback circuit 17 corresponding to a change in the range of frequencies or pass band to be imparted to the main signal-translating channel 16 of the feedback amplifier 16, 17. The adjustable taps 55, 56, and 57 of the voltage dividers 36, 48, and 41, respectively, are actuated simultaneously by a unicontrol mechanism 58 which is arranged for continuous rotation by a motor 59 driving a clutch 60. The driven portion 61 of the clutch 60 is movable axially out of engagement with its driving portion 62 by means of a bell-crank mechanism 63 having a pivoted fork 64 adapted to engage a disc 65 when a solenoid 66 is energized so as to attract a magnetic core 67 connected to one end of the fork. The bell-crank mechanism 63 also includes an arm 68 having a friction member 69 at its free end for selective engagement with a peripheral surface of the driven clutch portion 61. A coil spring 79 normally maintains the arm 68 and its frictional element 69 out of engagement with portion 61 so that motor 59 normally is permitted to drive the adjustable taps 55–57, inclusive, so that they sweep back and forth over the resistive elements of the voltage dividers 36, 48, and 41. As will be explained subsequently, the motor 59 and the various elements for controlling the condition of the clutch 60 together with the feedback network 17 constitute means for continuously varying the frequency-response characteristic of the feedback amplifier 16, 17 in the absence of beat-frequency information derived by detector 14 and having a portion which exceeds a predetermined amplitude, and for ceasing to vary that characteristic when that portion exceeds that predetermined value so that unit 16 translates beat-frequency information accurately corresponding to the velocity of the aircraft and the position of the target in relation to the direction of movement of the craft.

The indicating system 15 comprises a first control apparatus including an amplitude-responsive device in the form of a signal-strength detector 70 responsive to at least a portion of the beat frequency information derived by unit 14 when that portion lies within a predetermined range of frequencies established by the feedback amplifier 16, 17. The input terminals of the detector 70 are connected to the output terminals 27, 27 of the unit 16 while the output terminals of the former are connected to the control electrode-cathode circuit of a control tube 71 which is normally biased to cutoff by the potential supplied to its control electrode from a source —B through a resistor 72. The cathode of tube 71 is grounded while its anode is connected to a source +B through the winding 73 of a relay 80 arranged simultaneously to actuate a pair of switch blades 74 and 75 mechanically connected to a magnetic core 76 within the winding. Switch blades 74 and 75 are arranged for engagement with a pair of lower relay contacts b and b' and also with upper contacts a and a' associated with respective potential sources +B' and +B. Switch blade 74 is connected to a time-delay device 77 capable of affording a suitable delay such as about 0.5 second to a signal or potential translated to a switch contact b" associated with its output circuit. Switch blade 74 is also connected through a switch blade 78 to the solenoid 66. The signal-strength detector 70, control tube 71, relay 80, and the time-delay device 77 may be considered as the first control apparatus mentioned above.

The indicating means 15 further includes a second control apparatus including a frequency counter 81 responsive to the frequency of the translated portion of the beat-frequency signal when the last-mentioned frequency is substantially constant for providing an indication representative of a fixed obstacle directly in the path of the aircraft while distinguishing from derived beat-frequency information representative of fixed obstacles in the general path of the aircraft but not in the direct path thereof. The frequency counter 81 has its input circuit coupled to the output terminals 26, 26 of unit 16 and includes the cascade combination of an amplifier and symmetrical limiter 82, a differentiating circuit 83, an asymmetrical limiter, integrator and amplifier 84, and a differentiating circuit and amplifier 85. The second control apparatus further includes a control tube 86 having its control electrode-cathode input circuit coupled to the output circuit of the differentiating circuit and amplifier 85 and normally maintained in a nonconductive condition by a source of potential —B coupled to the control electrode of the tube through a resistor 87. The anode of tube 86 is connected through the winding 88 of a relay 90 to the fixed contact of the switch blade 75 of relay 80. Winding 88, when energized, moves a core 89 arranged simultaneously to actuate the switch blade 78 and a second switch blade 91 from positions associated with lower switch contacts b''' and b'' to positions associated with upper switch contacts a''' and a''. The fixed contact of switch blade 91 is connected to a suitable obstacle-warning indicator 92 which may be capable of providing an audible or a visible indication or both.

*Operation of FIG. 1 obstacle-indicating system*

Figure 2:
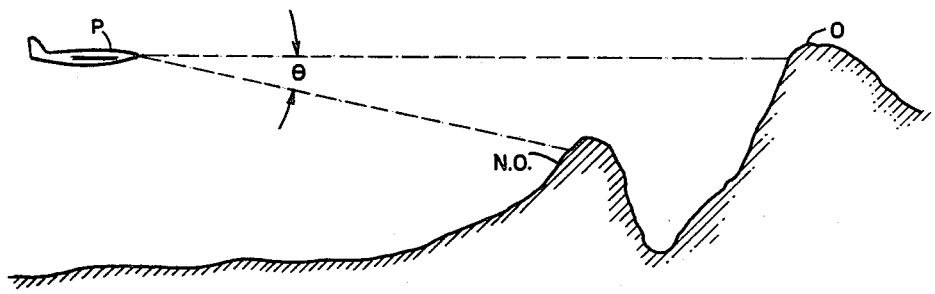
FIG. 2 is an elevational view of an aircraft in flight used in explaining the operation of the system of FIG. 1.

In considering the operation of the obstacle-indicating system, it will be assumed that the aircraft P carrying that system is flying along a path represented by the horizontal dash line represented in FIG. 2 and that its pilot desires an indication of an obstruction such as the obstacle O which is directly in the path of the craft but wishes to exclude from that indication false warnings from obstructions such as the obstacle N.O. in the general path but not in the direct path. It will also be assumed that, as previously stated, the transmitter 10 develops for radiation by the antenna system 11 an unmodulated continuous wave signal having a suitable high frequency such as 10,000 megacycles per second. This wave-signal energy is directed in a broad yet rather flat horizontal beam directly ahead of the aircraft in the general path of the latter. A portion of the radiated energy is reflected with moderate intensity from obstacles such as the obstacle N.O. in the general path of the craft and with higher intensity from the obstacle O which is directly in the path and is intercepted by the antenna system 13 of the receiver 12. Transmitted and received energy is applied to the beat-frequency detector which, in the well-known manner, develops a beat-frequency signal from the wave signals applied thereto. It is well known that energy reflected from the obstacle O in the direct path of the craft causes a beat-frequency or Doppler signal to be developed in the output circuit of the beat-frequency detector 14 which does not vary in frequency when the aircraft is moving at a constant velocity. However, the frequency of the Doppler signal developed in the output circuit of the detector 14 from reflected wave-signal energy from the obstacle N.O., which is below the direct line of flight of the aircraft, continuously decreases as the aircraft approaches the obstacle. The instantaneous frequency of this last-mentioned Doppler signal is the product of the frequency of the first-mentioned Doppler signal and the cosine of the angle $\theta$ represented in FIG. 2. As the aircraft approaches the obstacle, the angle $\theta$ increases and its cosine decreases so that the frequency of the Doppler signal produced by energy reflected from the obstacle N.O. below the line of flight of the aircraft decreases.

Since the aircraft is capable of flying over a wide range of speeds, it is important that the frequency-selective amplifier 16, 17 coupled to the output circuit of the beat-frequency detector 14 be conditioned to translate beat-frequency information related to the velocity of the aircraft. To this end, the unicontrol mechanism 53, 54 of the feedback network 17 is adjusted so that the switch blades 37, 49, and 42 make engagement with selected resistors such as the resistors 38, 50, and 43, thereby providing a coarse or range adjustment of the frequency-response characteristic of the feedback amplifier 16, 17 so that it translates with high gain beat-frequency signals related to the speed of the aircraft and to obstacles in the direct path while discriminating against beat-frequency signals related to obstacles in the general path but not in the direct path and not so related to speed. The adjustment just mentioned so alters the parameters of the resistor-condenser elements in the feedback network that the signal-translating channel 16 primarily translates the band of frequencies including the desired beat-frequency information.

Figure 3:
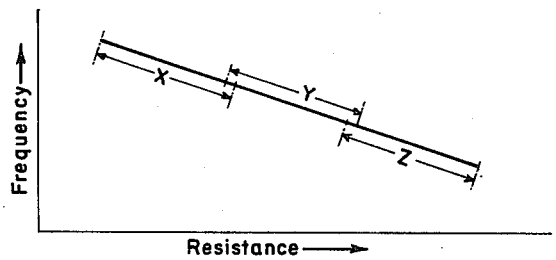
FIG. 3 is a graph employed in explaining the operation of the obstacle-indicating system of the present invention.
Figure 4:
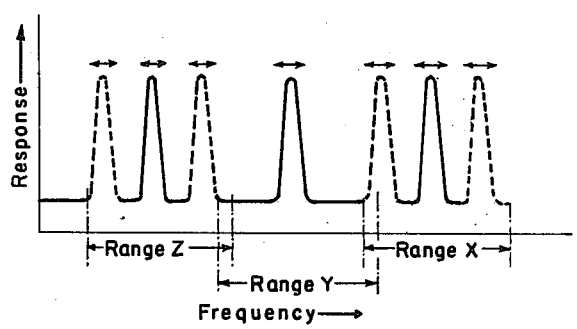
FIG. 4 is another graph used in explaining the operation of the FIG. 1 system.

FIG. 3 is a graph representing the frequency-resistance characteristic of the feedback amplifier 16, 17 and shows three resistance ranges X, Y, and Z which correspond to individual ones of the three settings of the unicontrol switch blades 37, 49, and 42 taken in conjunction with the voltage dividers 36, 48, and 41. It is considered preferable to have some overlap in these ranges. The voltage dividers just mentioned effect resistance variations within the respective resistance ranges X, Y, and Z. FIG. 4 represents the frequency-response characteristic of the feedback amplifier system 16, 17. The solid-line curve represents the frequency-response characteristic of the foregoing amplifier system near the center of each of the frequency ranges X, Y, Z and this response is shifted over individual ones of each of the foregoing ranges by means of the motor 59 which varies the positions of the adjustable taps 55, 56, and 57 of the voltage dividers 36, 48, and 41 by means of the several driving connections constituting the clutch 60 and driven elements 65 and 58. Assuming for the moment that the unicontrolled switches 37, 49, and 42 are adjusted as represented in FIG. 1 so that the range X constitutes the range of frequencies of the Doppler signal to be translated by the feedback amplifier 16, 17, then the motor 59 driving the adjustable taps 55, 56, and 57 of the described voltage dividers shifts the frequency-response characteristic of the signal-translating channel 16 over the range X as represented in FIG. 4 by the combination of the broken-line and solid-line curves and by the arrows above those curves. It will be seen that the frequency-selective network 17 effects a peaking of the gain of the amplifier 16, 17 while effecting a sharp rejection action of frequencies on either side of the peaked signal. This shifting or sweeping of the frequency-response characteristic of the amplifier 16, 17 for the Doppler signal derived by the beat-frequency detector 14 is desirable and is frequently necessary since the speed of the aircraft is often subject to unknown variations in the magnitudes of the head winds, tail winds, or cross winds which effect the ground speed of the craft.

As the aircraft approaches obstacles O and N.O. represented in FIG. 2, echoes are received from both of these obstacles. When the transmitter 10 and its antenna system 11 radiate a continuous wave signal having a frequency of 10,000 megacycles per second and the aircraft is travelling at a speed of 100 miles per hour, the Doppler signal developed in the output of the beat-frequency detector 14 from the transmitted signal and the echo from a fixed object such as obstacle O has a frequency of about 2980 cycles per second. The sweeping of the frequency-response characteristic of the feedback amplifier 16, 17 in the range X will be assumed to cause that amplifier to translate to its output terminals 27, 27 a beat-frequency signal within that range and having portions with a frequency of 2980 cycles per second. The amplifier 16, 17 selectively amplifies signals having a range frequency centered about 2980 cycles per second and sharply rejects other unwanted beat-frequency signals. The 2980 cycles per second translated signal has an amplitude sufficient to actuate the signal-strength detector 70 which in turn develops an output signal that overcomes the bias established on the control electrode-cathode input circuit of control tube 71 by the source —B and renders that tube conductive. The anode current of tube 71 energizes relay winding 73 of relay 80 and brings the switch blades 74 and 75 into engagement with the upper sets of contacts $a$, $a'$. The source $+B'$ is connected through the switch blade 74 to the time-delay device 77 which, for a brief interval of time such as 0.5 second, delays the application of the potential $+B'$ through switch blade 91 of relay 90 to the obstacle-warning indicator 92. Briefly, the purpose of this time delay is to allow the system to reach an equilibrium point before the obstacle-warning indicator 92 affords an indication as will be explained subsequently.

The engagement of switch blade 74 with contact $a$ also connects the source $+B'$ through contact $b'''$ and switch blade 78 to the solenoid 66, thereby attracting the core member 67 and actuating the crank mechanism 63 in a manner to cause the pivoted fork 64 thereof to engage disc 65 so as to disengage the clutch portions 61 and 62. At the same time the friction member 69 on arm 68 is brought into engagement with the driven portion 61 of the clutch and is effective quickly to bring that portion to a stop, thereby discontinuing the movement of the contacts 55, 56, and 57 over the resistance elements of the voltage dividers 36, 48 and 41. As a result, the feeback amplifier 16, 17 is quickly made selective by this feedback circuit 17 containing the twin-T network so that the rejection characteristic of the amplifier is adjusted to result in a peaking of the amplifier gain at a frequency of substantially 2980 cycles per second, which frequency corresponds to the desired beat frequency representative of the speed of the aircraft approaching a fixed obstacle directly in its path.

Figure 5:
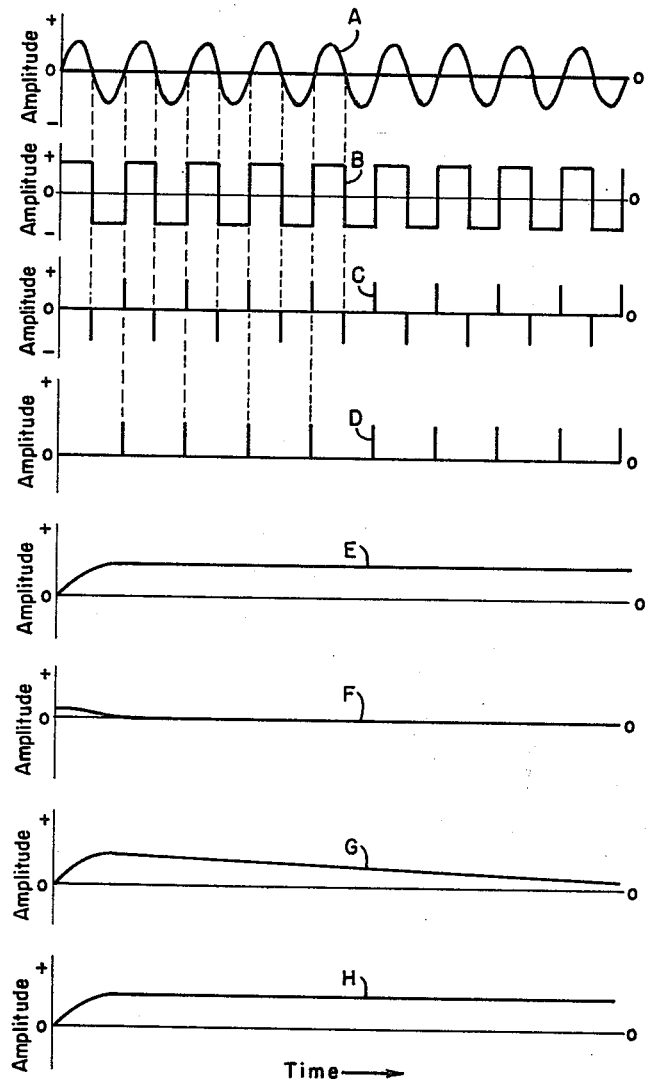
FIG. 5 is a series of curves employed in explaining the operation of the above-mentioned system.

For the conditions under consideration when the clutch 60 is disengaged, there is applied from the anode circuit of tube 22 of a signal-translating channel 16 to the input terminals 26, 26 of the amplifier and symmetrical limiter 82 of frequency counter 81, a beat-frequency signal having the wave form represented by Curve A of FIG. 5. Amplification and symmetrical limiting take place in unit 82 to produce a signal having the wave form represented by Curve B of FIG. 5. The limiting action in unit 82 also serves the additional purpose of effectively reducing or eliminating lower-intensity signals such as those from objects similar to obstacle N.O. of FIG. 2 in the general path of the aircraft but not in the direct path thereof. The differentiated output signal of the differentiating circuit 83 has the wave form represented by Curve C and, after asymmetrical limiting in unit 84, has the form represented by Curve D. The integrating circuits of unit 84 integrate the wave of Curve D to develop an output signal similar to that represented by Curve E. The wave of Curve E is differentiated in the differentiating circuit of the differentiating circuit and amplifier 85 and appears as represented by Curve F, which signal effectively has a zero amplitude since the differential of a nonvarying signal is zero. Accordingly, for the conditions under consideration wherein the aircraft is flying at a substantially constant speed of 100 miles per hour at a fixed obstacle directly in its path, the output signal of the differentiating circuit and amplifier 85 is zero and the negative control voltage from this source —B on the control electrode of the control tube 86 keeps that tube in a nonconductive condition even though the voltage +B is applied through switch contact a' of relay 80, switch blade 75 and relay winding 88 of relay 90 to the anode of the control tube 86. About this time or approximately one-half second after switch blade 74 of relay 80 engages contact a, energy from the source +B' is translated through the time-delay device 77 and switch blade 91 of relay 90 to the obstacle-warning indicator 92, thereby producing a visible or audible or both types of indications which inform the pilot that the fixed obstacle lies directly in the path of his aircraft so that he can take appropriate steps such as climbing to a higher altitude.

When the craft is climbing to the higher altitude or has reached that higher level above the obstacle formerly in the direct path of the craft, the output signal of the differentiating circuit and amplifier 85 is no longer zero but has some positive value which overcomes the negative bias applied to the control electrode of tube 86 from the source —B. This causes control tube 86 to conduct and the flow of current in the relay winding 88 connects the switch blades 91 and 78 with their respective upper relay contacts a'' and a'''. Consequently, the obstacle-warning indicator 92 is disconnected from the time-delay device 77 and its source of operating potential +B' and the solenoid 66 is also disconnected from that source. The spring 79 now controls the fork 64 of the bell-crank mechanism 63 and moves the fork in a direction such that it releases the disc 65 and permits the driven portion 61 of the clutch 60 to come into engagement with the driven portion 62. At the same time the friction material 69 is released from the periphery of the driven portion 61 of the clutch and the braking action thereon ceases. In a manner previously described, the motor 59 proceeds to actuate the taps 55, 56, and 57 of the voltage dividers 36, 48 and 41 of unit 17 and causes the frequency-response characteristic of the feedback amplifier 16, 17 to sweep over a range of frequencies such as range X of FIG. 4 in search of a large amplitude beat-frequency signal from the beat-frequency detector 14. In the absence of such a signal, the output of detector 70 is ineffective to overcome the bias on tube 71 and it becomes nonconductive, thereby causing the upper contacts a, a' of the relay 80 to open and disconnect the source +B from the winding 88 of relay 90 in the anode circuit of control tube 86. This in turn opens the upper contacts a'' and a''' of relay 90.

It will now be assumed that the aircraft is flying toward an extremely large object such as a mountain which is in the general path of the craft but not in its direct path, and that a large amplitude echo is intercepted by the antenna system 13 of receiver 12. It will also be assumed that the beat-frequency signal developed in the output circuit of detector 14 is of sufficient amplitude after translation by the feedback amplifier 16, 17 to actuate the signal-strength detector 70 and render the control tube 71 conductive, thereby operating the relay 80 and causing switch blades 74 and 75 to make engagement with the upper relay contacts a and a', in the manner previously described. The solenoid 66 is energized and the clutch 60 is disengaged so that the continuous variation of the resistance of the voltage dividers 36, 48, and 41 ceases, thereby rendering the amplifier 16, 17 operative to amplify a small band of beat-frequency signals closely centered about the particular beat frequency occurring at that moment while rejecting other signals of a frequency somewhat removed from that center frequency. Under this condition the output signal supplied to the terminals 26, 26 of the amplifier and limiter 82 of the frequency counter 81 would momentarily be a variable-frequency signal somewhat similar to that represented by Curve A of FIG. 5. Because of difficulties of representing such a signal in the available space in the drawings, this variable-frequency signal has not been shown. However, the output signals of units 83, 84 and the differentiating circuit of unit 85 would be similar to those represented by Curves B, C, and D of FIG. 5 but the spacings of the various pulses would be nonuniform. The output signal of the integrator portion of unit 84 would resemble the wave represented by Curve G and would decrease in slope as the aircraft approached the mountain or obstruction which was in its general path but not directly in that path. The decrease in the amplitude is related to the decrease in the frequency of the Doppler signal. The output signal of the differentiating circuit and amplifier 85 of frequency counter 81 would now have some positive value similar to that represented by Curve H of FIG. 5. This signal would overcome the negative bias of the control tube 86, thereby rendering it conductive and energizing the winding 88 of relay 90. This in turn would actuate its switch blades 91 and 78 in a direction to engage the upper relay contacts a'' and a''', respectively. The opening of the relay 90 will disconnect the warning device 92 from the time-delay device 77 so that any potential applied to its input circuit from source +B' will not be effective to actuate the indicator. Furthermore, the circuit to the solenoid 66 will be interrupted, thereby releasing the bell-crank mechanism 63 so that the clutch 60 engages and renews the continuous variation of the resistance of the voltage dividers 36, 48, and 41. Thus, the obstacle-indicating system of FIG. 1 is capable of differentiating between true and false obstruction warnings from fixed obstacles directly in the path of the aircraft employing the warning system and from obstacles in the general path thereof but not in its direct path.

When the aircraft is operated to fly at a different but constant speed from that mentioned above and obstruction warning indications are desired, it is only necessary to adjust the unicontrol mechanism 53, 54 of unit 17 so as to select a different set of resistors such as resistors 39, 51, and 44. This adjustment provides a coarse adjustment of the frequency-response characteristic of the feedback amplifier 16, 17 and may, for example, correspond to a setting representative of an aircraft velocity of 80 miles per hour. The operation of the obstacle-warning system is identical with that described for the previous adjustment of the unicontrol mechanism 53, 54.

From the foregoing explanation, it will be seen that the indicating means 15 of the obstacle-indicating system utilizes the beat-frequency information derived by the beat-frequency detector when the amplitude of at least a portion thereof exceeds predetermined value and only when the frequency of that portion is substantially constant for providing an indication representative of a fixed obstacle directly in the path of an aircraft flying at a constant velocity while distinguishing from derived beat-frequency information representative of fixed obstacles in that general path but not in the direct path.

While the invention has been described in connection with aircraft capable of moving at substantially constant velocities, it will be clear that the obstacle-warning system is also useful on surface-moving vehicles such as trains, automobiles, and ships.

From the foregoing description, it will be clear that since the obstacle-indicating system of the present invention does not require antenna systems which gyrate or otherwise move in a predetermined path, relatively simple and inexpensive antenna systems may be employed. It will also be clear that an obstacle-indicating system in accordance with the invention does not require the constant attention of the aviator and is relatively immune to false warnings which may occur when an aircraft is flying at a low altitude.

While there has been described what is at present considered to be the preferred embodiment of this invention, it will be obvious to those skilled in the art that various changes and modifications may be made therein without departing from the invention, and it is therefore, aimed to cover all such changes and modifications as fall within the true spirit and scope of the invention.

What I claim is:

1. A system for indicating collision course between two objects including apparatus on one of the objects comprising: means for radiating a signal toward the second object; means for receiving reflections of said signal; means for deriving Doppler frequency signals from said reflections; and means responsive jointly to amplitude and frequency for distinguishing between Doppler frequency signals representative of the second object and those representative of other objects not on the collision course to provide an output signal indicating the presence of said second object on a collision course.

2. A system to be used on a moving object for indicating an obstacle in the path of that object, comprising: means for radiating a signal in the path of that object; means for receiving reflections of the signal from obstacles; means for deriving Doppler frequency signals from the reflections; and means responsive jointly to amplitude and frequency for distinguishing between Doppler frequency signals representative of obstacles directly in the path of the moving object and those representative of obstacles not directly in that path to provide an output signal indicating the presence of obstacles directly in the path of the moving object.

3. A system to be used on an aircraft for indicating a fixed obstacle directly in the path of that aircraft, comprising: means for radiating a signal in the path of that aircraft; means for receiving reflections of the signal from fixed obstacles; means for deriving Doppler frequency signals from the reflections; and means responsive jointly to amplitude and frequency for distinguishing between Doppler frequency signals representative of fixed obstacles directly in the path of the moving aircraft and those representative of fixed obstacles not directly in that path to provide an output signal indicating the presence of fixed obstacles directly in the path of the moving aircraft.

4. A system to be used on a moving object for indicating an obstacle in the path of that object, comprising: means for radiating a constant frequency signal in the path of that object; means for receiving reflections of the signal from obstacles; means for deriving Doppler frequency signals from the reflections; and means for distinguishing between high amplitude constant frequency Doppler frequency signals representative of obstacles directly in the path of the moving object and lower amplitude varying frequency Doppler frequency signals represenative of obstacles not directly in that path to provide an output signal indicating the presence of obstacles directly in the path of the moving object.

5. A system to be used on an aircraft for indicating a fixed obstacle directly in the path of that aircraft, comprising: means for radiating a constant frequency signal in the path of that aircraft; means for receiving reflections of the signal from fixed obstacles; means for deriving Doppler frequency signals from the reflections; and means for distinguishing between high amplitude constant frequency Doppler frequency signals representative of fixed obstacles directly in the path of the moving aircraft and lower amplitude varying frequency Doppler frequency signals representative of fixed obstacles not directly in that path to provide an output signal indicating the presence of fixed obstacles directly in the path of the moving aircraft.

6. A system for use on an object moving at a substantially constant velocity to develop an indication representative of the presence of a fixed obstacle in the path of that object comprising: means for radiating wave-signal energy in the general path of that object at a substantially constant frequency; means for receiving that portion of said energy reflected from obstacles in that general path and from an obstacle which may be directly in the path; means for deriving beat-frequency information from said transmitted and said received wave-signal energy; and means responsive jointly to the amplitude of at least a portion of said beat-frequency information when said portion lies within a predetermined range of frequencies and to the frequency of said portion when said last-mentioned frequency is substantially constant for providing an indication representative of a fixed obstacle directly in the path while distinguishing from derived beat-frequency information which changes in frequency and is representative of fixed obstacles in that general path but not in the direct path.

7. A system for use on an object moving at a selectable substantially constant velocity to develop an indication representative of the presence of a fixed obstacle in the path of that object comprising: means for radiating wave-signal energy in the general path of that object at a substantially constant frequency; means for receiving that portion of said energy reflected from obstacles in that general path and from an obstacle which may be directly in the path; means for deriving beat-frequency information from said transmitted and said received wave-signal energy; means having a frequency-response characteristic controllable in accordance with the selected velocity of the object for translating that portion of said beat-frequency information primarily related to said velocity and said obstacle in the direct path; and means responsive jointly to the amplitude of said translated portion of said beat-frequency information and to the frequency of said portion when said last-mentioned frequency is substantially constant for providing an indication representative of a fixed obstacle directly in the path while distinguishing from derived beat-frequency information representative of fixed obstacles in that general path but not in the direct path.

8. A system for use on an object moving at a selectable substantially constant velocity to develop an indication representative of the presence of a fixed obstacle in the path of that object comprising: means for radiating wave-signal energy in the general path of that object at a substantially constant frequency; means for receiving that portion of said energy reflected from obstacles in that general path and from an obstacle which may be directly in the path; means for deriving beat-frequency information from said transmitted and said received wave-signal energy; a feedback amplifier having a pass band controllable over a range of frequencies in accordance with the selected velocity of the object for translating that portion of said beat-frequency information primarily related to said velocity and said obstacle in the direct path; and means responsive jointly to the amplitude of said translated portion of said beat-frequency information and to the frequency of said portion when said last-mentioned frequency is substantially constant for providing an indication representative of a fixed obstacle directly in the path while distinguishing from derived beat-frequency information representative of fixed obstacles in that general path but not in the direct path.

9. A system for use on an object moving at a substantially constant velocity to develop an indication representative of the presence of a fixed obstacle in the path of that object comprising: means for radiating wave-signal energy in the general path of that object at a substantially constant frequency; means for receiving that portion of said energy reflected from obstacles in that general path and from an obstacle which may be directly in the path; means for deriving beat-frequency information from said transmitted and said received wave-signal energy; a frequency-selective amplifier including means for sweeping the pass band of said amplifier over a predetermined range of frequencies in accordance with the selected velocity of the object for translating that portion of said beat-frequency information primarily related to said velocity and said obstacle in the direct path; and means responsive jointly to the amplitude of said translated portion of said beat-frequency information and to the frequency of said portion when said last-mentioned frequency is substantially constant for providing an indication representative of a fixed obstacle directly in the path while distinguishing from derived beat-frequency information representative of fixed obstacles in that general path but not in the direct path.

10. A system for use on an object moving at a substantially constant velocity to develop an indication representative of the presence of a fixed obstacle in the path of that object comprising: means for radiating wave-signal energy in the general path of that object at a substantially constant frequency; means for receiving that portion of said energy reflected from obstacles in that general path and from an obstacle which may be directly in the path; means for deriving beat-frequency information from said transmitted and said received wave-signal energy; means having a frequency-response characteristic controllable in accordance with the selected velocity of the object for translating that portion of said beat-frequency information primarily related to said velocity and said obstacle in the direct path; means for continuously varying said characteristic in the absence of said beat-frequency information having said portion exceeding a predetermined amplitude and for ceasing to vary said characteristic when said portion exceeds said predetermined value so that said controllable means then translates beat-frequency information accurately corresponding to said velocity; and means responsive jointly to the amplitude of said translated portion of said beat-frequency information and to the frequency of said portion when said last-mentioned frequency is substantially constant for providing an indication representative of a fixed obstacle directly in the path while distinguishing from derived beat-frequency information representative of fixed obstacles in that general path but not in the direct path.

11. A system for use on an object moving at a substantially constant velocity to develop an indication representative of the presence of a fixed obstacle in the path of that object comprising: a fixed antenna system for radiating wave-signal energy in a broad directional beam in the general path of that object at a substantially constant frequency; means for receiving that portion of said energy reflected from obstacles in that general path and from an obstacle which may be directly in the path; means for deriving beat-frequency information from said transmitted and said received wave-signal energy; and means responsive to said beat-frequency information when the amplitude of at least a portion thereof exceeds a predetermined value and when the frequency of said portion is substantially constant for providing an indication representative of a fixed obstacle directly in the path while distinguishing from derived beat-frequency information which changes in frequency and is representative of fixed obstacles in that general path but not in the direct path.

12. A system for use on an object moving at a substantially constant velocity to develop an indication representative of the presence of a fixed obstacle in the path of that object comprising: means for radiating wave-signal energy in the general path of that object at a substantially constant frequency; means for receiving that portion of said energy reflected from obstacles in that general path and from an obstacle which may be directly in the path; means for deriving beat-frequency information from said transmitted and said received wave-signal energy; and means including an amplitude detector responsive to said beat-frequency information when the amplitude of at least a portion thereof exceeds a predetermined value and including a frequency-responsive device responsive to said portion when the frequency thereof is substantially constant for providing an indication representative of a fixed obstacle directly in the path while distinguishing from derived beat-frequency information which changes in frequency and is representative of fixed obstacles in that general path but not in the direct path.

13. A system for use on an object moving at a substantially constant velocity to develop an indication representative of the presence of a fixed obstacle in the path of that object comprising: means for radiating wave-signal energy in the general path of that object at a substantially constant frequency; means for receiving that portion of said energy reflected from obstacles in that general path and from an obstacle which may be directly in the path; means for deriving beat-frequency information from said transmitted and said received wave-signal energy; and means including an amplitude detector and a first control means responsive to said beat-frequency information when the amplitude of at least a portion thereof exceeds a predetermined value and including a frequency-responsive device and a second control means responsive to said portion when the frequency thereof is substantially constant for providing an indication representative of a fixed obstacle directly in the path while distinguishing from derived beat-frequency information which changes in frequency and is representative of fixed obstacles in that general path but not in the direct path.

14. A system for use on an object moving at a substantially constant velocity to develop an indication representative of the presence of a fixed obstacle in the path of that object comprising: means for transmitting wave-signal energy in the general path of that object at a substantially constant frequency; means for receiving that portion of said energy reflected from obstacles in that general path and from an obstacle which may be directly in the path; means for deriving beat-frequency information from said transmitted and received wave-signal energy; and means including a first relay which is energized in response to said beat-frequency information when the amplitude of at least a portion thereof exceeds a predetermined value and including a second relay which remains de-energized when the frequency of said portion is substantially constant for providing an indication representative of a fixed obstacle directly in the path while distinguishing from derived beat-frequency information representative of fixed obstacles in that general path but not in the direct path.

References Cited by the Examiner

UNITED STATES PATENTS

| | | | |
|---|---|---|---|
| 2,367,907 | 1/45 | Wallace | 343—112.4 |
| 2,499,349 | 3/50 | Ayres | 343—112.4 |
| 2,650,357 | 8/53 | Munster | 343—7.7 |
| 2,776,426 | 1/57 | Altman | 343—7.7 |
| 3,081,456 | 3/63 | Waer | 343—7 |

OTHER REFERENCES

"Radar Offers Solution," by James Brantley, appearing in the November 1959 issue of Electronics, pages 146–150.

CHESTER L. JUSTUS, *Primary Examiner*.

FREDERICK M. STRADER, KATHLEEN CLAFFY,
*Examiners.*